United States Patent [19]

Haile

[11] 4,013,351
[45] Mar. 22, 1977

[54] CONVEX MIRROR AND FRAME

[76] Inventor: Ernest Haile, 30 Cadwalader Terrace, Trenton, N.J. 08618

[22] Filed: Aug. 8, 1975

[21] Appl. No.: 603,244

[52] U.S. Cl. .............................................. 350/293
[51] Int. Cl.² ......................................... G02B 5/10
[58] Field of Search .................... 350/293, 302–304, 350/307; D12/187, 189

[56] References Cited

UNITED STATES PATENTS

| | | | |
|---|---|---|---|
| 3,170,985 | 2/1965 | Katulich | 350/293 |
| 3,389,952 | 6/1968 | Tobin | 350/293 |
| 3,563,638 | 2/1971 | Panozzo | 350/293 |
| 3,764,201 | 10/1973 | Haile | 350/303 |

*Primary Examiner*—John K. Corbin
*Assistant Examiner*—Jon W. Henry
*Attorney, Agent, or Firm*—Clarence A. O'Brien; Harvey B. Jacobson

[57] ABSTRACT

A mounting plate of generally semi-circular plan shape is provided and includes one straight side edge and an opposing arcuate side edge whose opposite ends converge toward the ends of the straight side edge. The straight side edge of the mounting plate includes a first flange extending therealong and projecting outwardly from one side of the mounting plate. The opposite or second arcuate side edge of the mounting plate includes outturned flange portions which terminate outwardly in inturned flange portions and a partial convex spherical mirror element of generally semi-circular plan shape is disposed in registry over the one side of the mounting plate with the arcuate edge of the mirror element receiving the aforementioned inturned flange portions. The outer edge of the first flange is arcuate and includes an inturned flange over which the corresponding edge of the mirror element is disposed. Further, a cap plate of generally the same shape as the first flange is secured in overlying relation relative to the latter and includes a free edge portion which projects beyond the outer edge of the first flange and the corresponding inturned flange underlying the mirror element. The outer edge of the cap plate, however, includes an inturned flange which closely overlies the adjacent marginal edge portion of the mirror element. In this manner, the mirror element is securely supported from the mounting plate in a manner enabling its ready removal merely by removal of the cap plate. Of course, suitable gasket material may be applied about the edges of the mirror element in order to cushion the support of the mirror element from the mounting plates and its component parts.

12 Claims, 4 Drawing Figures

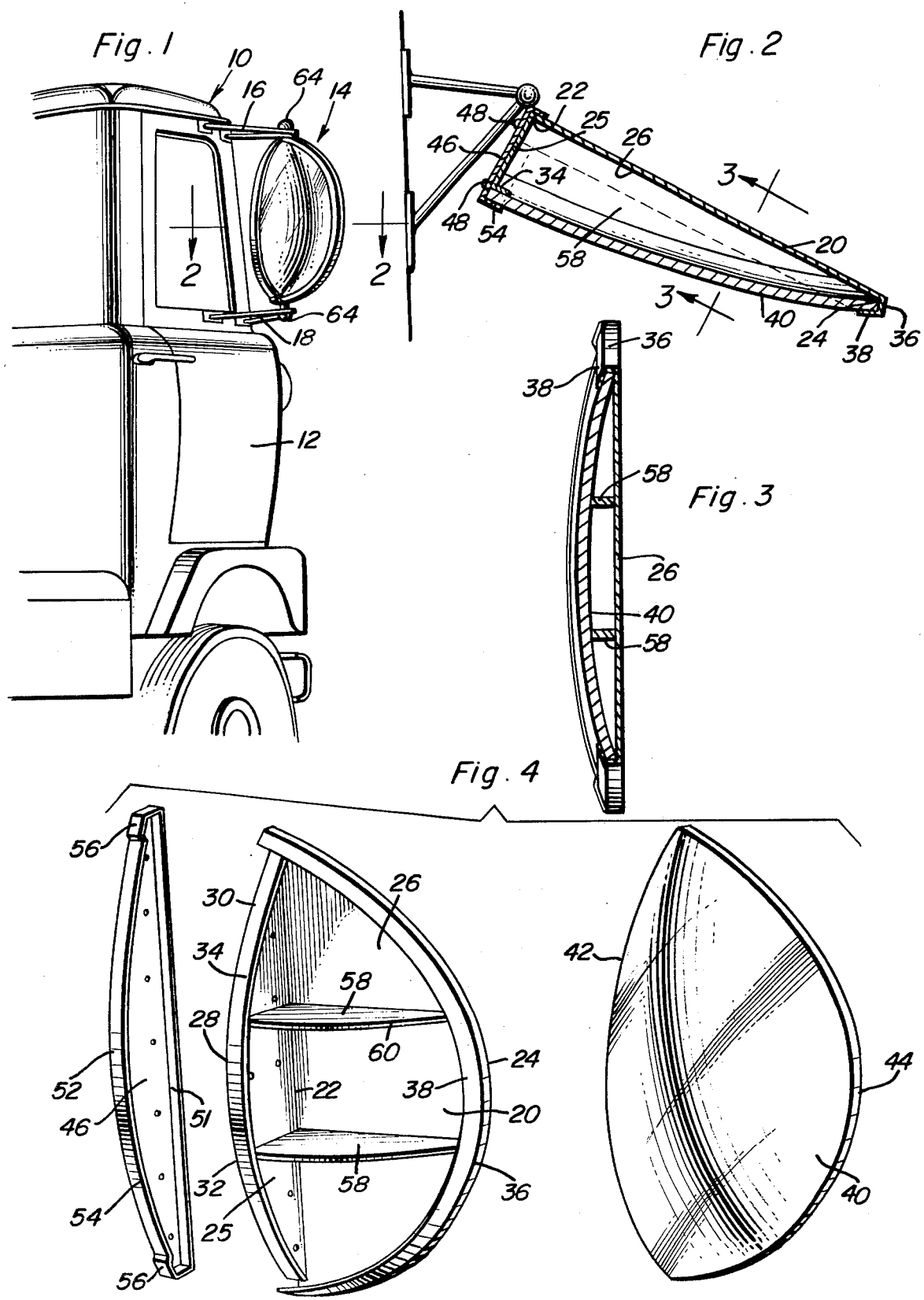

CONVEX MIRROR AND FRAME

BACKGROUND OF THE INVENTION

Mirror constructions providing horizontally widened and vertically elongated rear viewing areas have been heretofore designed. However, these previous designed mirror constructions have for various reasons been reasonably costly to manufacture. The examples of previously patented mirror constructions including some of the basic features of the instant invention are disclosed in U.S. Pat. Nos. 2,493,546, 3,337,285, 3,776,618 and 3,527,527. In addition, the instant invention comprises an improvement over the framing and mounting means for a rear vision mirror disclosed in my co-pending U.S. application Ser. No. 513,000, filed Oct. 7, 1974, now Pat. No. 3,901,587.

BRIEF DESCRIPTION OF THE INVENTION

The invention includes a mirror element which is generally semicircular in plan shape and yet is partial convex spherical in configuration. The mirror element is supported by a specifically designed frame intended to be constructed of plastic material and yet to provide a secure mounting for the mirror element. Inasmuch as the frame is constructed of plastic material, the need for peripherally arranged mirror element cushioning gasket material is eliminated in all instances except for instances wherein the frame might be subjected to severe vibrations.

It is proposed that the frame portion of the instant invention be constructed of plastic for various reasons including substantially total resistance to weathering and corrosion, color matching to the color of the associated vehicle and inexpensive cost of manufacture.

The main object of this invention is to provide a rear vision mirror construction for a vehicle including only two basic components other than the mirror element thereof and which therefore may be manufactured at a reasonably low cost.

Another object of this invention is to provide a frame construction for a rear vision mirror to be attached to a vehicle with the structural features of the frame enabling the latter to be readily constructed of plastic by conventional manufacturing processes.

Another object of this invention is to provide a mirror construction frame constructed of plastic and which will therefore eliminate the need for cushioning gasket material around the associated mirror element in substantially all instances.

Another important object of this invention is to provide a mirror construction in accordance with preceding objects and which may also be readily usable in environments other than as a rear vision vehicle mirror.

The final object of this invention to be specifically enumerated herein is to provide a mirror construction which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the right-hand forward portion of a vehicle with the mirror construction of the instant invention mounted on the vehicle in position as a rear vision mirror;

FIG. 2 is an enlarged fragmentary horizontal sectional view taken substantially upon the plane indicated by the section line 2-2 of FIG. 1;

FIG. 3 is a fragmentary view taken substantially upon the plane indicated by the section line 3-3 of FIG. 2; and FIG. 4 is an exploded perspective view of the various components which together form the mirror construction.

DETAILED DESCRIPTION OF THE PREFERRED EMBODIMENTS

Referring now more specifically to the drawings, the numeral 10 generally designates a motor vehicle including a right-hand forward door 12. The mirror construction of the instant invention is referred to in general by the reference numeral 14 and is adjustably supported from the door 12 by means of conventional mirror supporting brackets 16 and 18.

The mirror construction 14 includes a mounting plate 20 having first and second opposite side edges 22 and 24. The side edge 22 is substantially straight and the side edge 24 is substantially semi-circular with its opposite ends converging toward the opposite ends of the side edge 22.

The side edge 22 includes an integral outstanding first flange 25 projecting outwardly of one side 26 of the mounting plate 20 and the outer edge 28 of the first flange 25 is arcuate including opposite ends portions 30 and 32 which progressively decrease in width toward the plate 20 at continuously increasing rates.

The outer edge 28 terminates outwardly in an arcuate inturned second flange 34 which overlies the side 26 of the plate 20 and the second edge 24 of the mounting plate 20 includes an outstanding flange 36 extending therealong and which also projects outwardly of the side 26 of the plate 20. The outer edge of the flange 36 terminates in an inturned flange 38 overlying the side 26 of the plate 20.

A partial convex sperical mirror element 40 is provided and the plan shape of the element 40 is semi-circular so as to conform to the semi-circular plan shape of the plate 20. The mirror element includes first and second edges 42 and 44 corresponding to the edges 22 and 24 and the edge 44 of the element 40 is received beneath the flange 38 while the edge 42 of the mirror element 40 overlaps the flange 34.

A cap plate 46 is provided and secured in overlying relation to the outer surface of the first flange 24 by means of threaded fasteners 48. The cap plate 46 includes straight and arcuate edges 51 and 52 which correspond to and project outwardly beyond the edges 22 and 28 and a full peripheral inturned flange 54 which overlies the adjacent marginal edge of the plate 20, the corresponding end portions of the flanges 36 and 38 and the edge 42 of the element 44 overlying the flange 34, the opposite ends of the arcuate portion of the flange 54 including outwardly offset portions 56 to receive the opposite ends of the flange 38 thereunder.

The mounting plate 20 includes reinforcing flanges 58 extending between the edges 22 and 24 which project outwardly of the side 26 of the mounting plate 20. The flanges 58 are formed integrally with the mounting plate 20 as well as the first flange 25 and include arcuate surfaces 60 which closely underlie and support the opposing concave spherical inner surface portions of the element 40.

The plate 20 and flanges 25, 34, 36 and 38 as well as the flanges 58 may all be of one-piece construction with the entire assembly constructed of plastic. However, the flanges 58 may be omitted if desired. In addition, the cap plate 46 is constructed of plastic material and is readily removably supported from the second flange 25 by means of fasteners 48. In this manner, the entire mirror construction 14 independent of the mirror element 40 may be readily manufactured at a low cost. Further, by utilizing a plastic material in the construction of the mounting plate and its attached components as well as the cap plate 46, the need for a cushioning peripheral gasket on the mirror element 40 is substantially eliminated.

In order to support the mirror construction 14 from the brackets 16 and 18 pivot fastener structures 64 are secured through the opposite end portions of the flange 36 and also through the outer ends of the brackets 16 and 18. Alternately, instead of utilizing a pair of pivot fastener structures 64, a single pivot shaft structure may extend between and have its opposite ends secured through the opposite end portions of the flange 36, suitable openings being provided through the flanges 58 if such a pivot shaft structure is to be utilized In any event, the mirror 14, other than the mirror element 40, may be readily constructed of plastic so as to provide a self-cushioning support structure for the element 40. In addition, the plastic construction insures that the mirror construction will not be subject to deterioration by weathering and all components of the mirror construction 14 other than the element 40 may be color keyed to the color of the particular vehicle on which the mirror construction 14 is to be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A mirror construction comprising a mirror element including first and second opposite side edges, a mounting plate of a plan shape corresponding to the plan shape of said element over one side of which said element is placed in plan registry therewith, said plate including first and second opposite side edges corresponding with the first and second side edges, respectively, of said element, the first side edge of said plate being generally straight and including a first flange extending therealong and projecting outwardly of said one side edge of said plate and including an outer free edge, said outer free edge of said first flange including opposite end portions which curve inwardly toward said plate, the free outer edge of said first flange terminating outwardly in a second inwardly directed flange overlying said one side of said plate in spaced relation relative thereto, the second side edge of said plate including opposite end portions which curve inwardly toward the remote ends of the first side edge of said plate, said second side edge end portions including retaining flange portions extending therealong, projecting outwardly of said one side of said plate and terminating outwardly in inturned flange portions overlying said one side of said plate in spaced relation relative thereto, said second side edge of said element being held captive within said retaining flange portions and beneath said inturned flange portions, said first side edge of said element overlying said second flange, and a cap panel removably secured over the outer side of said first flange and including an outer marginal edge corresponding to and projecting outwardly beyond said free outer edge of said first flange, said outer marginal edge of said cap panel terminating outwardly in an inturned retaining flange overlying the first side edge of said element.

2. The combination of claim 1 including mounting means supported from said mounting plate for support of said mirror construction from a support structure.

3. The combination of claim 1 wherein said mounting plate is supported from said mounting means for adjustable angular displacement relative thereto about an axis generally paralleling said first side edge of said mounting plate.

4. The combination of claim 1 wherein the opposite end portions of said retaining flange include outwardly offset terminal ends overlying the corresponding ends of said inturned flange portions.

5. The combination of claim 1 including elongated reinforcing flanges supported from said one side of said mounting plate, projecting outwardly therefrom and extending between said first and second edges, said reinforcing flanges including arched outer longitudinal edges underlying and closely conforming to the contours of the adjacent portions of the side of said mirror element opposing said one side of said mounting plate.

6. The combination of claim 1 wherein said cap panel is removably secured over said first flange by means of fasteners secured through said cap panel.

7. The combination of claim 1 wherein the opposite end portions of said retaining flange include outwardly offset terminal ends overlying the corresponding ends of said inturned flange portions, and including elongated reinforcing flanges supported from said one side of said mounting plate, projecting outwardly therefrom and extending between said first and second edges, said reinforcing flanges including arched outer longitudinal edges underlying and closely conforming to the contours of the adjacent portions of the side of said mirror element opposing said one side of said mounting plate.

8. The combination of claim 1 wherein said element is concavo convex and partial spherical in configuration.

9. A mirror construction comprising a mirror element including first and second opposite side edges, a mounting plate of a plan shape corresponding to the plan shape of said element over one side of which said element is placed in plan registry therewith, said plate including first and second opposite side edges corresponding with the first and second side edges, respectively, of said element, the first side edge of said plate being generally straight and including a first flange extending therealong and projecting outwardly of said one side of said plate and including an outer free edge, said first flange including opposite end portions which curve inwardly toward said plate, the free outer edge of said first flange terminating outwardly in a second inwardly directed flange overlying said one side of said plate in spaced relation relative thereto, the second side edge of said plate including opposite end portions which curve inwardly toward the remote ends of the first side edge of said plate, said second side edge end portions including retaining flange portions extending therelaong, projecting outwardly of said one side of said plate and terminating outwardly in inturned flange portions overlying said one side of said plate is spaced relation relative thereto, said second side edge of said element being held captive within said retaining flange portions and beneath said inturned flange portions, said first side edge of said element overlying said second flange, and a cap panel removably secured over the outer side of said first flange and including [an outer marginal edge corresponding to and projecting outwardly beyond said free outer edge of said first flange, said outer marginal edge of said cap panel terminating outwardly in an inturned retaining flange overlying first side edge of said element, and a cap panel removably secured over the outer side of said first flange and including] inturned peripheral flange portions overlying said first side edge of said element, the outer side of said plate adjacent the first side edge thereof and the ends of said retaining flange portions and inturned flange portions.

10. A mirror construction comprising a mirror element including first and second opposite side edges, a mounting plate of a plan shape corresponding to the plan shape of said element over one side of which said element is placed in plan registry therewith, said plate including first and second opposite side edges corresponding with the first and second side edges, respectively, of said element, the first side edge of said plate being generally straight and including a first flange extending therealong and projecting outwardly of said one side edge of said plate and including an outer free edge, said outer free edge of said first flange including opposite end portions which curve inwardly toward said plate, the free outer edge of said first flange terminating outwardly in a second inwardly directed flange overlying said one side of said plate in spaced relation relative thereto, the second side edge of said plate including opposite end portions which curve inwardly toward the remote ends of the first side edge of said plate, said second side edge end portions including retaining flange portions extending therealong, projecting outwardly of said one side of said plate and terminating outwardly in inturned flange portions overlying said one side of said plate in spaced relation relative thereto, said second side edge of said element being held captive within said retaining flange portions and beneath said inturned flange portions, said first side edge of said element overlying said second flange, and means anchoring said first side edge of said element in position overlying said second flange against movement away from the latter and movement of said element across said second flange away from said retaining flange portions.

11. The combination of claim 10, wherein said element is concavoconvex and partial sperical in configuration, elongated reinforcing flanges supported from one side of said mounting plate, projecting outwardly therefrom and extending between said first and second edges, said reinforcing fanges including arched outer longitudinal edges underlying and closely conforming to the contours of the adjacent portions of the concave side of said mirror element opposing said one side of said mounting plate.

12. A mirror construction comprising a concavo-convex mirror element including first and second opposite side edges, a mounting plate of a plan shape corresponding to the plan shape of said element over one side of which said element is placed registry thereiwth with the concave side of said element opposing said plate, said plate including first and second opposite side edges corresponding with the first and second side edges, respectively, of said element, the first side edge of said plate being generally straight, the second side edge of said plate including opposite end portions which curve inwardly toward the remote ends of the first side edge of said plate, said second side edge end portions including retaining flange portions extending therealong, projecting outwardly from said one side of said plate and terminating outwardly in inturned flange portions overlying said one side of said plate in spaced relation relative thereto, said second side edge of said element being held captive within said retaining flange portions and beneath said inturned flange portions, said first side edge of said element being generally registered with said first side edge of said plate, elongated reinforcing flanges supported from said one side of said mounting plate, projecting outwardly therefrom and extending between said first and second edges of said plate, said reinforcing flanges including arched outer longitudinal edges underlying and closely conforming to the adjacent portions of the concave side of said mirror element opposing said one side of said plate, and means anchoring said first side edge of said element in position against movement away from said plate and the corresponding ends of said arched outer longitudinal edges and against movement of said element along said arched outer longitudinal edges to shift said second side edge of said element away from said retaining flange portions.

* * * * *